(12) United States Patent
Connors et al.

(10) Patent No.: US 12,546,732 B2
(45) Date of Patent: Feb. 10, 2026

(54) AUTOMATED BEAM ON EDGE VIBRATION ANALYSIS

(71) Applicant: FEI Company, Hillsboro, OR (US)

(72) Inventors: Scott Connors, Hillsboro, OR (US);
Joseph M Lebow, Hillsboro, OR (US);
Sophia Weeks, Hillsboro, OR (US);
Rehan A Khwaja, Hillsboro, OR (US);
Vincent Baker, Hillsboro, OR (US);
Matthew Whiteside, Hillsboro, OR (US)

(73) Assignee: FEI Company, Hillsboro, OR (US)

(*) Notice: Subject to any disclaimer, the term of this patent is extended or adjusted under 35 U.S.C. 154(b) by 441 days.

(21) Appl. No.: 18/328,668

(22) Filed: Jun. 2, 2023

(65) Prior Publication Data

US 2024/0402102 A1 Dec. 5, 2024

(51) Int. Cl.
*G01N 23/2251* (2018.01)
*G06T 7/13* (2017.01)
*G06T 7/246* (2017.01)

(52) U.S. Cl.
CPC ........... *G01N 23/2251* (2013.01); *G06T 7/13* (2017.01); *G06T 7/246* (2017.01); *G01N 2223/303* (2013.01); *G01N 2223/3301* (2013.01); *G06T 2207/10061* (2013.01); *G06T 2207/20048* (2013.01); *G06T 2207/30241* (2013.01)

(58) Field of Classification Search
CPC ......... G01N 23/2251; G01N 2223/303; G01N 2223/3301; G06T 7/13; G06T 7/246; G06T 2207/10061; G06T 2207/20048; G06T 2207/30241; H01J 37/00; H01J 37/02; H01J 37/26; H01J 37/28; H01J 2237/0216; H01J 2237/2809
USPC .............................. 250/492.3, 306, 307, 311
See application file for complete search history.

(56) References Cited

U.S. PATENT DOCUMENTS

| | | | |
|---|---|---|---|
| 5,916,424 A * | 6/1999 | Libby | G11B 5/3163 |
| 6,541,770 B1 | 4/2003 | Veneklasen | |
| 6,781,141 B2 | 8/2004 | Scaman | |
| 9,129,353 B2 | 9/2015 | Shirai et al. | |
| 2008/0210863 A1* | 9/2008 | Pinna | H01J 37/256 |
| | | | 250/306 |

(Continued)

*Primary Examiner* — Jason L Mccormack
(74) *Attorney, Agent, or Firm* — Leron Vandsburger

(57) ABSTRACT

Disclosed herein are scientific instrument support systems, as well as related methods, apparatus, computing devices, and computer-readable media. In some embodiments, a support apparatus for a scientific instrument includes a processing device and an interface device. The processing device runs a first software module to operate the scientific instrument in a spot mode and in an imaging mode and a second software module to implement spot-mode measurements along a trajectory crossing an edge feature in a sample. The interface device supports communications between the processing device and an acquisition circuit of the scientific instrument. The second software module specifies spot locations and dwell times along the trajectory based on a calibrated disturbance waveform. The processing device receives a time series of the signals acquired by the acquisition circuit during the spot-mode measurements and computes a frequency spectrum of vibrational disturbances in the scientific instrument based on the received time series.

20 Claims, 10 Drawing Sheets

(56) References Cited

U.S. PATENT DOCUMENTS

2010/0224792 A1\* 9/2010 Zhang .................. H01J 37/261
 702/56
2011/0254944 A1 10/2011 Ishitani et al.

\* cited by examiner

AUTOMATED BEAM ON EDGE VIBRATION ANALYSIS

TECHNICAL FIELD

Various example embodiments relate generally to microscopy components, instruments, systems, and methods.

SUMMARY

An electron microscope is susceptible to environmental disturbances, as it is used to observe small feature sizes at high levels of magnification. Manufacturers of electron microscopes take this susceptibility into consideration and develop criteria for maximum acceptable electromagnetic-interference, acoustic-noise, and vibration levels, so that their instruments will function well. For example, vibration analysis is an important step in factory acceptance testing, site acceptance testing, in-field troubleshooting, and product development.

Disclosed herein are, among other things, various examples, aspects, features, and embodiments of a scientific instrument including a charged-particle beam column, acquisition circuitry, and detectors supporting at least an imaging operating mode and a spot operating mode.

An electronic controller associated with the scientific instrument runs software to selectively operate the scientific instrument in various operating modes. According to an example embodiment, the software is augmented with a beam on edge module configured to implement a sequence of spot-mode measurements in a sample along a trajectory crossing an edge feature thereof, which is selected via the imaging mode. The spot locations along the trajectory and the corresponding dwell times are determined by mapping a periodic waveform, such as a sine wave having a frequency in the audio frequency range, onto the trajectory. A time series of the signals acquired via the acquisition circuitry and detectors during the sequence of spot-mode measurements are Fourier transformed to compute a frequency spectrum of vibrational disturbances in the scientific instrument. Accordingly, some disclosed embodiments advantageously provide a capability for performing in-situ, software-controlled calibrated beam on edge analyses that beneficially circumvents a need for connecting external hardware typically used for such analyses in accordance with some other solutions.

One example provides a support apparatus for a scientific instrument, the support apparatus comprising: one or more processing devices configured to run a first software module to selectively operate the scientific instrument in a spot mode and in an imaging mode and to run a second software module to configure the first software module to implement a sequence of spot-mode measurements in a plurality of spots along a trajectory crossing an edge feature in a sample; and an interface device to support communications between the one or more processing devices and an acquisition circuit of the scientific instrument, the acquisition circuit being operable to steer a charged-particle beam with respect to the sample and to acquire signals produced via interaction of the charged-particle beam with the sample. The second software module is configured to specify a respective spot location and a respective dwell time for each of the plurality of spots based on a calibrated disturbance waveform. The first software module is configured to receive a time series of the signals acquired by the acquisition circuit during the sequence of spot-mode measurements. The one or more processing devices are further configured to compute a frequency spectrum of vibrational disturbances in the scientific instrument based on the time series.

Another example provides an automated method performed via a computing device for providing support to a scientific instrument, the method comprising: running, with a processor, a first software module to selectively operate the scientific instrument in a spot mode and in an imaging mode; running, with the processor, a second software module to configure the first software module to implement a sequence of spot-mode measurements in a plurality of spots along a trajectory crossing an edge feature in a sample; and transmitting, via an interface device, communications between the processor and an acquisition circuit of the scientific instrument, the acquisition circuit being operable to steer a charged-particle beam with respect to the sample and to acquire signals produced via interaction of the charged-particle beam with the sample. The second software module is configured to specify a respective spot location and a respective dwell time for each of the plurality of spots based on a calibrated disturbance waveform. The first software module is configured to receive a time series of the signals acquired by the acquisition circuit during the sequence. The automated method further comprises computing, with the processor, a frequency spectrum of vibrational disturbances in the scientific instrument based on the time series.

Yet another example provides a non-transitory computer-readable medium storing instructions that, when executed by a computing device, cause the computing device to perform operations comprising the above automated method.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings.

DETAILED DESCRIPTION

Reference herein to "one embodiment" or "an embodiment" means that a particular feature, structure, or characteristic described in connection with the embodiment can be included in at least one embodiment of the disclosure. The appearances of the phrase "in accordance with one embodiment" or "in accordance with an embodiment" in various places in the specification are not necessarily all referring to the same embodiment, nor are separate or alternative embodiments necessarily mutually exclusive of other embodiments. The same applies to the term "implementation."

Figure 1:
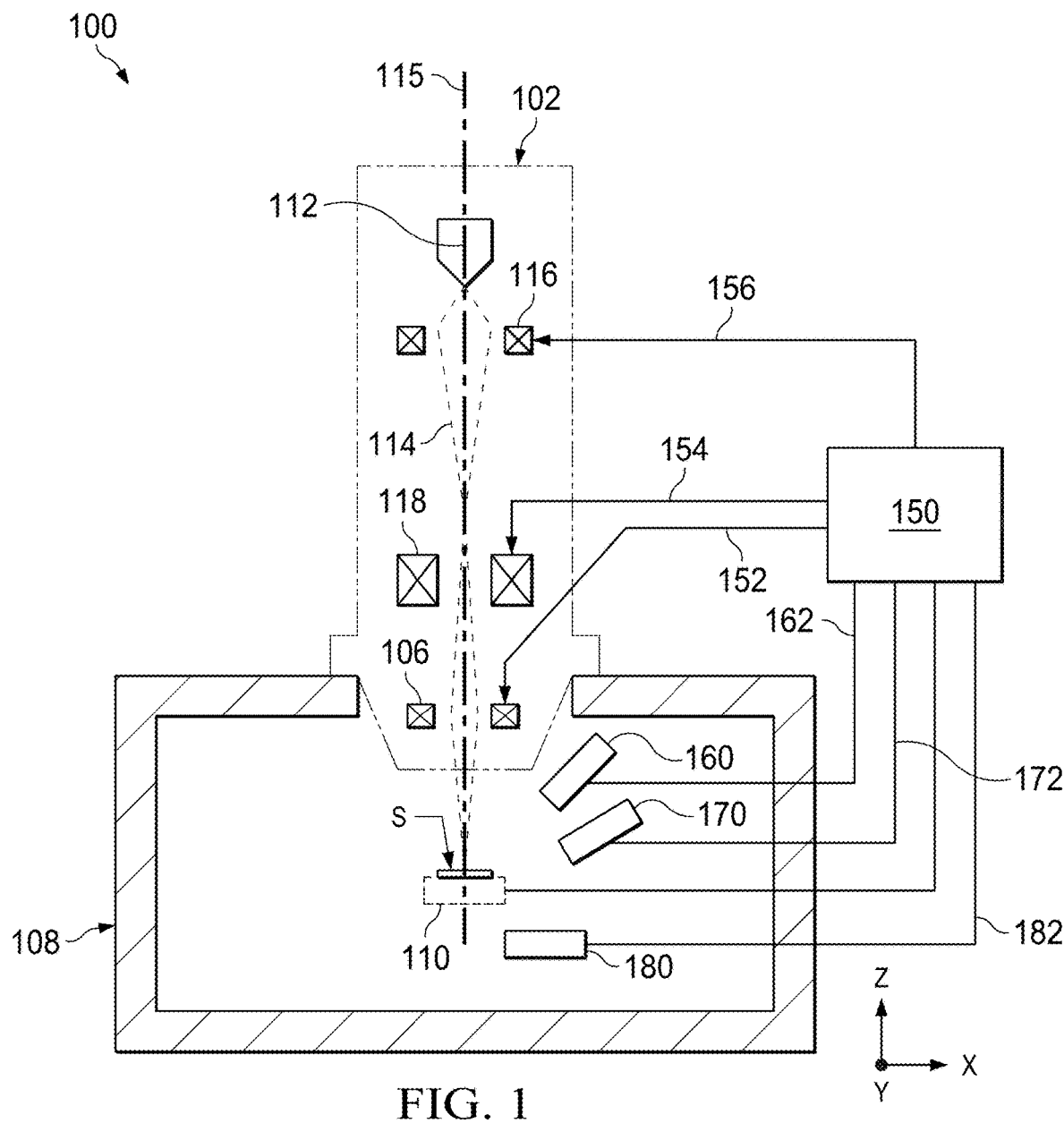
FIG. 1 is a block diagram illustrating a scientific instrument in accordance with some embodiments.

FIG. 1 is a block diagram illustrating a scientific instrument 100 in accordance with some embodiments. The scientific instrument 100 includes a charged-particle beam column 102 coupled to a vacuum chamber 108. In various examples, the charged-particle beam column 102 is a scanning electron microscope (SEM) column or a focused ion-beam (FIB) column. The vacuum chamber 108 houses therein a movable sample holder 110 and can be evacuated using one or more vacuum pumps (not explicitly shown in FIG. 1). In an example embodiment, the sample holder 110 is independently movable parallel to the XY-coordinate plane and parallel to the Z-coordinate axis, with the corresponding coordinate system being indicated by the XYZ-coordinate triad shown in FIG. 1. In some embodiments, the sample holder 110 is movable with six degrees of freedom including tilt in one or more rotational directions. A sample S to be interrogated using the scientific instrument 100 is mounted in the sample holder 110 as indicated in FIG. 1.

In one example, the (SEM-type) charged-particle beam column 102 comprises an electron source 112 and two or more charged-particle-beam (CPB) lenses, only two of which, e.g., an objective lens 106 and a condenser lens 116, are schematically shown in FIG. 1 for illustration purposes. In some examples, a different (from two) number of such lenses may be used in the SEM column 102.

In operation, the electron source 112 generates an electron beam 114 propagating generally along a longitudinal axis 115 of the SEM column 102. CPB lenses 106 and 116 are operated to generate electric and magnetic fields that affect electron trajectories in the electron beam 114. Control signals 152, 156 generated by an electronic controller 150 are used to change the strengths and/or spatial configurations of the fields and impart desired properties on the electron beam 114. In general, the CPB lenses 106 and 116, control signals 152 and 156, and other pertinent components of the scientific instrument 100 can be used to perform various operations and support various functions, such as beam focusing, aberration mitigation, aperture cropping, filtering, etc. The SEM column 102 further comprises a deflection unit 118 that can steer the electron beam 114 in response to a drive signal 154 applied thereto via the electronic controller 150. Such beam steering can be used to move a focused portion of the electron beam 114 to a selected spot on the sample S or along a desired path across the sample S, e.g., to perform spot-mode measurements or to perform a raster scan of the sample S in an imaging mode. In an example implementation of the imaging mode, the drive signal 154 changes over time to move the focused portion of the electron beam 114 across the sample S in a raster or other suitable scan pattern. In an example implementation of the spot mode, the drive signal 154 is constant (i.e., does not change over time) to keep the focused portion of the electron beam 114 in the corresponding selected fixed spot within the sample S.

In another example, the (FIB-type) charged-particle beam column 102 comprises an ion source 112 and ion-beam optics 106, 116, 118. In some instances, the ion source 112 is a plasma source connected to a plurality of gas volumes (not explicitly shown). The gas volumes are individually connectable to the plasma source via respective valves to select individual gases stored in the gas volumes or make mixtures thereof for the ion source. Example gases supplied to the ion source 112 in this manner are xenon, argon, oxygen, hydrogen, and nitrogen gases. In operation, the ion source 112 ionizes the supplied gas(es), thereby forming a plasma. Ions extracted from the plasma are then accelerated through the FIB column 102 to form an ion beam 114 propagating generally along a longitudinal axis 115 of the FIB column 102. The ion-beam optics 106, 116, 118 may be used, among other things, to focus the ion beam 114 at the sample S and to move a focused portion of the ion beam 104 to a selected spot on the sample S or along a desired path across the sample S. e.g., to perform spot-mode measurements or to perform a raster or vector scan of the sample S. In some other instances, the ion source 112 may comprise a liquid metal ion source (LMIS) or any other ion source compatible with the FIB column 102. In various configurations of the FIB column 102, the ion beam 114 may be used to perform imaging of the sample S or machining operations, such as, for example, incising, milling, etching, depositing, and the like.

The scientific instrument 100 also includes detectors 160, 170, 180 located in the vacuum chamber 108 in relatively close proximity to the sample S. In operation, the detectors 160, 170, and 180 generate streams of measurements 162, 172, and 182, which are received by the electronic controller 150. Specific types of the detectors 160, 170, 180 depend on the embodiment of the scientific instrument 100 and can typically be chosen from a variety of detector types suitable for detecting different types of emission and/or radiation from the sample S produced thereby in response to the charged-particle (electron or ion) beam 114. Example types of the emission/radiation that can be produced in this manner include, but are not limited to, X-rays, infrared light, visible light, ultraviolet light, back-scattered electrons, secondary electrons, Auger electrons, elastically scattered electrons, non-scattered (e.g., zero energy loss) electrons, and non-elastically scattered electrons.

In some examples, the scientific instrument 100 is a dual-beam instrument that includes first and second instances of the charged-particle beam column 102 coupled to the vacuum chamber 108. In such examples, the first instance is the above-described SEM-type charged-particle beam column 102, and the second instance is the above-described FIB-type charged-particle beam column 102. In various geometric arrangements, the longitudinal axes 115 of the SEM-type and FIB-type charged-particle beam columns 102 are oriented with respect to one another at an angle between approximately 30 degrees and 60 degrees.

In some instances, a beam on edge vibration-analysis method is used to measure and identify unwanted vibrations in the scientific instrument 100. In a representative example, this method includes placing the focused portion of the charge particle beam 114 on a high contrast (e.g., sharp gradient) edge in the sample S at high magnification and using a suitable one of the detectors 160, 170, 180 to record the corresponding stream of measurements 162, 172, or 182 as a function of time. Mechanical vibrations generated by some components (such as vacuum pumps) of the scientific instrument 100 and/or imparted onto the scientific instrument 100 by external vibration sources typically cause relative oscillatory movements of the focused portion of the charge particle beam 114 and the sample S, which repeatedly move the focused portion of the charge particle beam 114 across the high contrast edge of the sample S, thereby modulating the signal(s) detected by the detector(s) accordingly. The corresponding recorded time-dependent electrical signal 162, 172, or 182 can then be subjected to a frequency analysis including, e.g., applying a Fourier transform thereto to generate a frequency spectrum and then quantifying various frequency components of the frequency spectrum.

Based on the frequency analysis, one or more detrimental vibration sources can typically be identified. Thereafter, appropriate measures can be taken to move, reconfigure, alter, and/or vibrationally isolate the identified vibration source(s) to prevent the vibrations generated thereby from detrimentally affecting operations of the scientific instrument 100. In some use cases, certain control signals in the scientific instrument 100 can be modified to at least alleviate some adverse effects of an identified vibration, e.g., when the corresponding vibration source does not lend itself to effective isolation. Some embodiments of the above technique are also sensitive to and can be used to detect disturbances produced by non-mechanical sources, e.g., by electromagnetic interference.

In some examples, the above beam on edge vibration-analysis method includes injecting a calibrated periodic waveform into the beam-scanning electronics at a known frequency and with a known amplitude. One example of such a waveform is a sine wave having a frequency of 950 Hz and an amplitude of 1 nm. Other suitable periodic disturbance waveforms can similarly be used. The frequency spectrum obtained, e.g., as indicated above, then contains a corresponding calibration frequency component representing the injected periodic disturbance waveform. This calibration frequency component can beneficially be used for accurate quantification (in frequency and amplitude) of other frequency components of the spectrum attributable to various detrimental vibration sources.

For comparison, some conventional approaches to beam on edge vibration analyses rely on external hardware being connected to the scientific instrument 100. In some examples, such external hardware includes at least an external function generator connected to the charged-particle beam column 102 and an external signal analyzer connected to one or more of the detectors 160, 170, 180. To enable such connections and the corresponding measurements, the scientific instrument 100 is typically configured to have at least some of the following capabilities: (i) suitable external ports for making the mentioned external hardware connections; (ii) suitable analysis software, typically running on a separate computing device; and (iii) user-facilitated, e.g., manual, data transfer between different devices of the experimental setup, files, and/or file formats to analyze the measurement results. The measurements themselves are typically performed with expert assistance and/or support from a qualified system engineering professional present on-site.

For illustration purposes and without any implied limitations, example embodiments are described below in reference to embodiments of the scientific instrument 100 equipped with the SEM column 102. Based on the provided description, a person of ordinary skill in the pertinent art will be able to make and use other embodiments suitable for use with embodiments of the scientific instrument 100 equipped with the FIB column 102. Additional considerations for the FIB embodiments may include one or more of the following: (i) the ion-beam energy is preferably kept to a relatively low level such that the ion beam 114 still produces a good detector signal while not eroding the edge feature in the sample S in a noticeable way; (ii) it is possible to utilize secondary ion imaging modes instead of secondary electron imaging modes with some sets of detectors 160, 170, 180; (iii) although the acquisition circuitry of the dual beam instrument 100 typically has dedicated scan engines and acquisition recorders for the SEM column 102 and for the FIB column 102, such scan engines and acquisition recorders are designed to function in a substantially analogous way, which makes the corresponding beam on edge measurements and analyses to be substantially analogous as well.

Figure 2A:
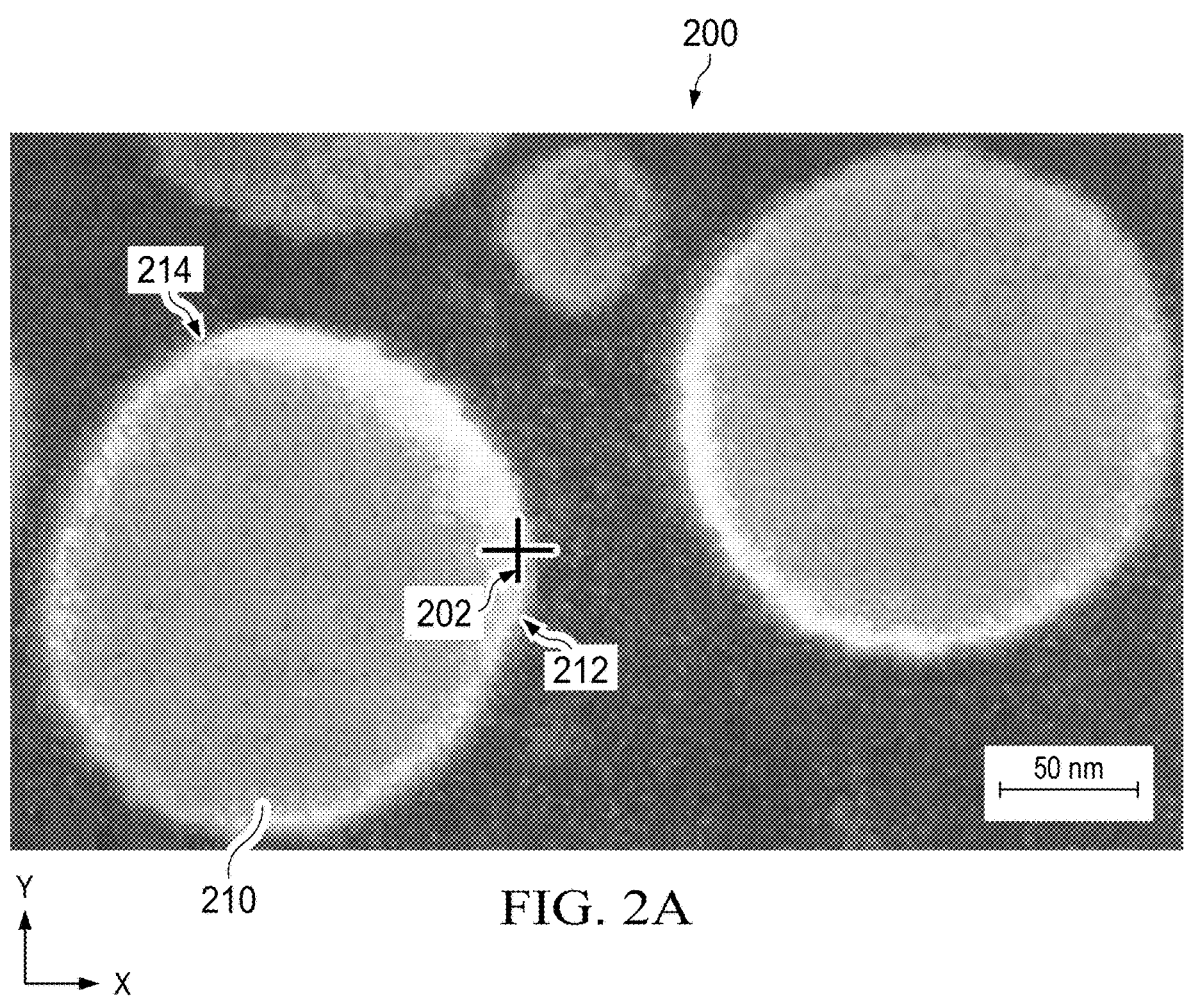
FIGS. 2A-2B show scanning electron microscope (SEM) images of a sample used for beam on edge measurements in the scientific instrument of FIG. 1 according to one example.
Figure 2B:
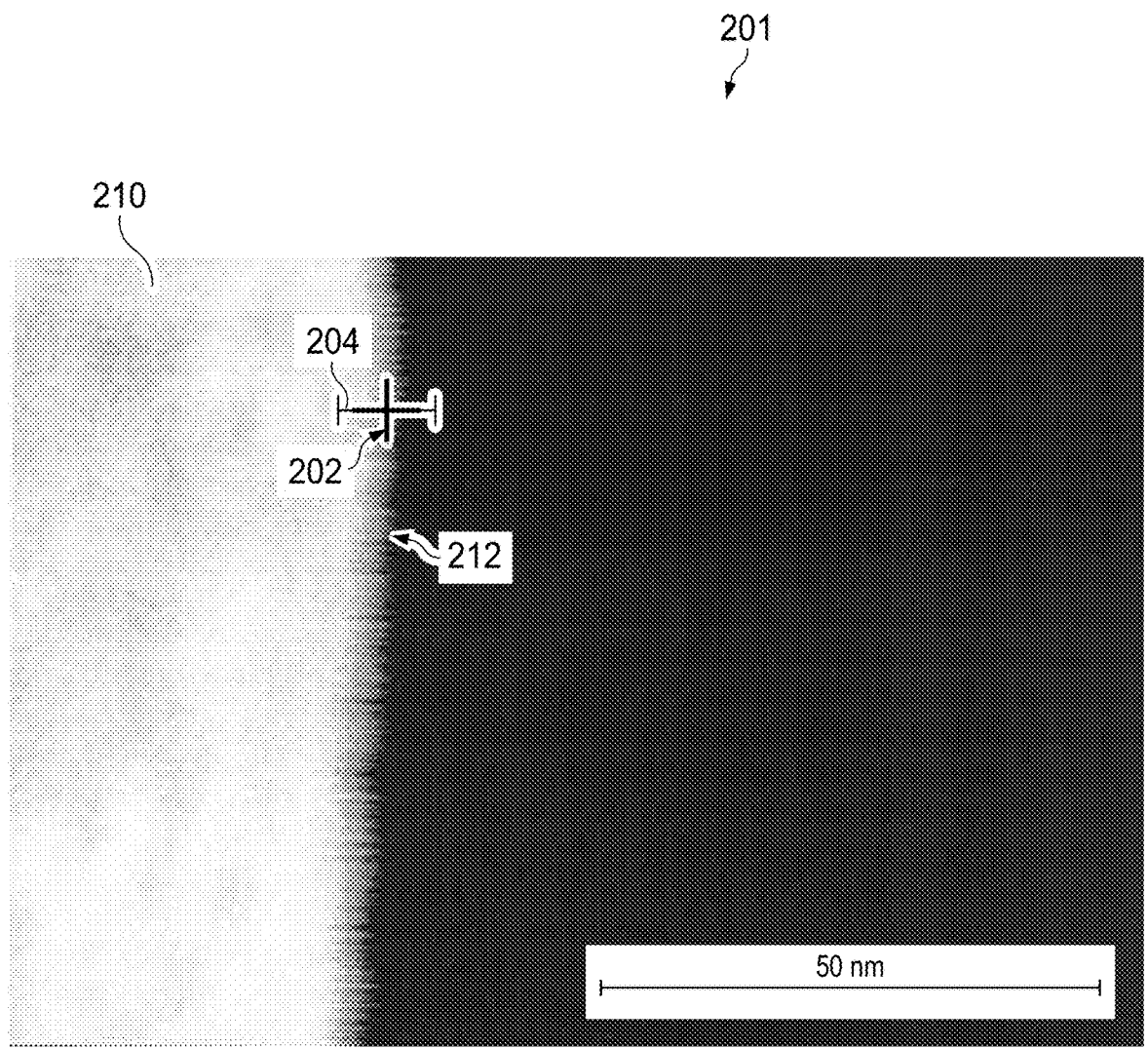

FIGS. 2A-2B show SEM images 200 and 201, respectively, of the sample S used for beam on edge vibration analyses in the scientific instrument 100 according to one example. More specifically, the image 200 (FIG. 2A) has a field of view (FOV) having the size of approximately 430 nm×260 nm. The image 201 (FIG. 2B) is a zoomed-in portion of the image 200 with a FOV having the size of approximately 110 nm×80 nm.

In the example shown, the sample S is a commercially available tin on carbon specimen including a dispersion of tin spheres, with sizes in the range between 30 nm and 200 nm, on a carbon substrate. In other examples, other suitable samples S can similarly be used. In FIGS. 2A-2B, a cursor 202 marks a portion of an edge 212 of a tin ball 210 selected for beam on edge measurements. The edge 212 is approximately parallel to the Y coordinate axis. For this edge selection, a trajectory 204 along which the electron beam 114 is oscillated during the beam on edge measurements is parallel to the X direction. The oscillations of the electron beam 114 along the trajectory 204 are performed based on the calibrated disturbance waveform as described in more detail below. When the electron beam 114 is positioned on the trajectory 204 to the left of the edge 212, the signal detected by the selected detector of the scientific instrument 100 is relatively strong, as represented by a high brightness level in the image 201 (FIG. 2B). In contrast, when the electron beam 114 is positioned on the trajectory 204 to the right of the edge 212, the signal detected by the detector is relatively weak, as represented by a low brightness level in the image 201. Thus, the oscillations of the position of the electron beam 114 along the X axis imparted in accordance with the calibrated disturbance waveform cause the detected signal to oscillate between a relatively high value and a relatively low value at a known (reference) frequency.

Any mechanical vibration that has a non-zero displacement component along the X axis modulates the detected signal corresponding to the edge 212 in a manner that is qualitatively similar to that of the above-described modulation caused by the calibrated disturbance waveform, but with its own frequency and amplitude. Different mechanical vibrations (e.g., originating from different vibration sources) will typically have different respective frequencies and amplitudes. The frequencies of such mechanical vibrations can be accurately determined based on the spectral analysis of the detected signal, transformed into frequency space (e.g., using a Fourier-type transform), and further based on the precisely known reference frequency of the calibrated disturbance waveform. The amplitudes of such mechanical vibrations can be accurately determined by comparing the amplitudes of the corresponding frequency components with the amplitude of the frequency component representing the calibrated disturbance waveform.

In some examples, the cursor 202 is similarly placed to select a portion of an edge 214 (see FIG. 2A) of the tin ball 210 for another series of beam on edge measurements. The edge 214 is approximately parallel to the X coordinate axis. For that edge selection, the calibrated disturbance waveform is mapped onto a trajectory (not explicitly shown) configured to oscillate the position of the electron beam 114 along the Y direction. The corresponding detected signal is sensitive to any mechanical vibration that has a non-zero displacement component along the Y axis.

In further examples, an arbitrarily oriented edge of the tin ball 210 or any other selected sharp-gradient feature of the sample S may also be used for beam on edge measurements. In individual ones of such further examples, the respective calibrated disturbance waveform is mapped onto a trajectory preferably (but not necessarily) configured to oscillate the position of the electron beam 114 along the direction that is approximately orthogonal to the direction of the selected edge in the XY coordinate frame. By performing measurements for a plurality of differently oriented edges and comparing the corresponding frequency-space information, anisotropic vibrational characteristics (if any) can be revealed.

Figure 3:
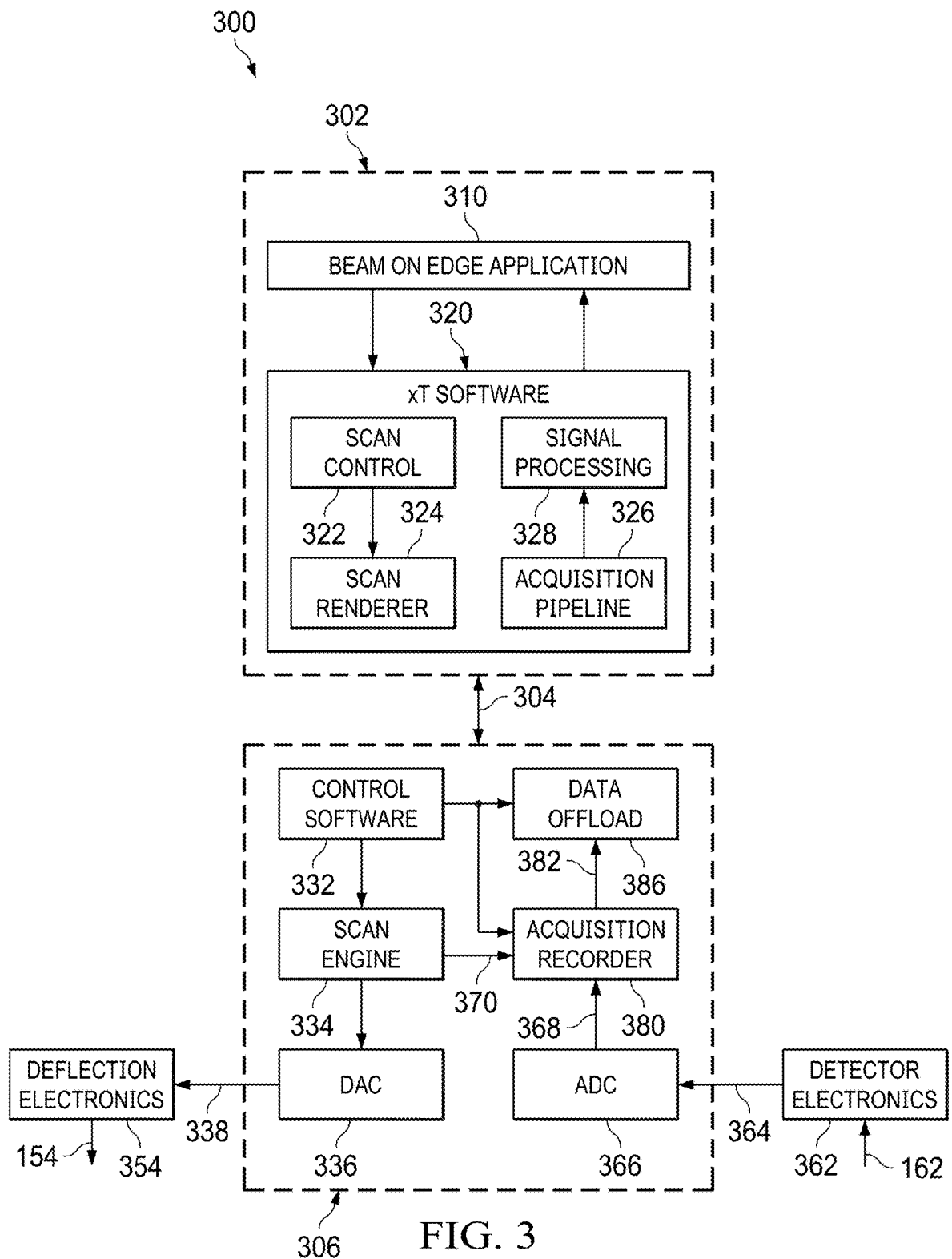
FIG. 3 is a block diagram of an electrical circuit used with the scientific instrument of FIG. 1 in accordance with various embodiments.

FIG. 3 is a block diagram of an electrical circuit 300 used in the electronic controller 150 of the scientific instrument 100 in accordance with various embodiments. The circuit 300 includes a computing device 302 and an acquisition circuit 306 connected via a communication link 304. In one example, the communication link 304 is a Gigabit Ethernet (GigE) link. In some examples, the communication link 304 can be a long-haul network link. The acquisition circuit 306 is further connected to beam deflection electronics 354 and to detector electronics 362. In operation, the beam deflection electronics 354 generates the drive signal 154 applied to the deflection unit 118 (also see FIG. 1). The detector electronics 362 detects the signal generated by the selected detector of the scientific instrument 100. In the example shown, the selected detector is the detector 160, and the detected signal is the signal 162 (also see FIG. 1).

The computing device 302 is configured to run a beam on edge application (software module) 310. When the application 310 is enabled, it interacts with an instrument-control (e.g., xT) software module 320 also running on the computing device 302 and configured to control various functions/modalities of the scientific instrument 100. In one example, the application 310 interacts with a scan control module 322 of the instrument-control software module 320 to modify a spot mode such that a scan pattern comprising a plurality of spots in each of which the scientific instrument 100 operates in the spot mode. The plurality of spots is arranged along a suitably selected trajectory (e.g., 204, FIG. 2B) and are mapped thereon based on the above-mentioned calibrated disturbance waveform. The amplitude and frequency of the calibrated disturbance waveform are selectable parameters within the application 310. In some examples, the frequency of the calibrated disturbance waveform is selected to be near an upper end of the target frequency range to reduce the likelihood of spectral interference with manifestations of various vibrations intended for characterization. The amplitude of the calibrated disturbance waveform is selected to cause the corresponding calibration frequency peak to be sufficiently prominent in the Fourier transform of the detected signal for convenient reference thereto.

A scan renderer module 324 of the instrument-control software module 320 operates to generate a calibrated scan signal representing the calibrated disturbance waveform by specifying a series of spatial (e.g., X, Y) spot locations and the respective dwell time at each location. The scan renderer module 324 further operates to generate a definition of the spot-mode scan and send the generated definition to the acquisition circuit 306 via the communication link 304. A control software module 332 running on an embedded processor of the acquisition circuit 306 subsequently writes the received spot-mode scan definition into a memory accessible to a scan engine 334 running in the programmable logic of the acquisition circuit 306. The scan engine 334 reads the scan definition from the memory and decodes the protocol to drive the corresponding series of spatial scan locations to a digital-to-analog converter (DAC) circuit 336 connected to the deflection electronics 354. In response to an input signal 338 received from the DAC circuit 336, the deflection electronics 354 generates the corresponding drive signal 154 for the deflection unit 118 (also see FIG. 1).

The detector electronics 362 detects the signal 162 generated by the detector 160 in response to the excitation of the sample S (e.g., shown in FIG. 2) by the electron beam 114 steered by the deflection unit 118, which is being driven with the drive signal 154 generated by the deflection electronics 354 as described above. A resulting detected analog electrical signal 364 is converted into a corresponding digital signal 368 by an analog-to-digital converter (ADC) circuit 366. The digital signal 368 is directed to an acquisition recorder 380 running in the programmable logic of the acquisition circuit 306. Using a set of acquisition markers 370 received from the scan engine 334, the acquisition recorder 380 synchronizes and maps different sections of the incoming digital signal 368 to the corresponding spatial positions from which the corresponding detector signal 162 originated. The acquisition recorder 380 further operates to generate a position-mapped full rate, decimated, or averaged data stream 382, which is then directed to a data offload engine 386. The data offload engine 386 operates to packetize the data stream 382 and to send a resulting stream of data packets, via the communication link 304, to the computing device 302.

An acquisition pipeline module 326 in the instrument-control software module 320 decodes the data packets received from the data offload engine 386 and forwards the decoded data to a signal processing function 328 of the instrument-control software module 320 for analyses. The signal processing function 328 applies a Fourier transform to convert the time series data into a corresponding frequency spectrum. The signal processing function 328 then directs both the time series and the corresponding frequency spectrum to the application 310, e.g., for display and further analysis (also see FIGS. 5-7).

Figure 4:
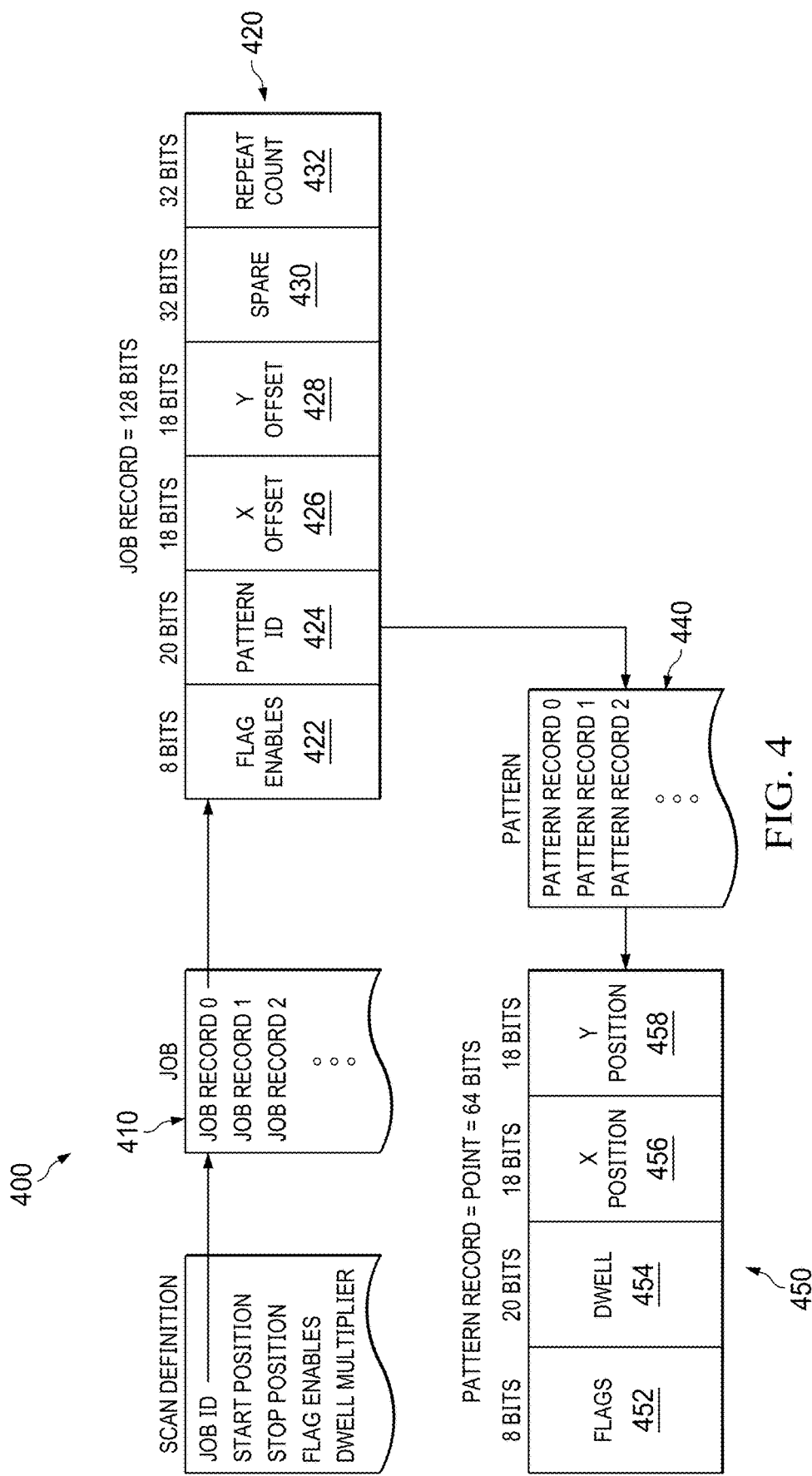
FIG. 4 is a block diagram illustrating a scan definition used in a software module of the scientific instrument of FIG. 1 according to some examples.

FIG. 4 is a block diagram illustrating a spot-mode scan definition 400 used in software modules 310, 320 according to some examples. The scan definition 400 includes a plurality of cross-referenced lists and tables and specifies a scan job ID, a start position of the scan, a stop position of the scan, a set of flag enables, and a dwell multiplier value. The job ID points to a respective scan job 410 that includes a plurality of job records 420. For illustration purposes, only three job records 420 (labeled Job Record 0, Job Record 1, and Job Record 2, respectively) of the scan job 410 are explicitly shown in FIG. 4. Each job record 420 has a length of 128 bits and includes the following fields: (i) a flag enables field 422; (ii) a pattern ID field 424; (iii) an X offset field 426; (iv) a Y offset field 428; (v) a spare field 430; and (vi) a repeat count field 432. The value stored in the pattern ID field 424 points to a respective pattern 440 that includes a plurality of pattern records 450. For illustration purposes, only three pattern records 450 (labeled Pattern Record 0, Pattern Record 1, and Pattern Record 2, respectively) of the pattern 440 are explicitly shown in FIG. 4. Each pattern record 450 defines a respective spot on the scan trajectory (e.g., 204, FIG. 2B), has a length of 64 bits, and includes the following fields: (i) a flags field 452; (ii) a dwell field 454; (iii) an X position field 456; and (iv) a Y position field 458.

In some examples, the "flag enables" field 422 is used to globally enable (when '1') or disable (when '0') the positionally corresponding Flags in the pattern record Flags. For example, the acquisition enable flag can be completely disabled at the job record level for all pattern records in the instantiated pattern. Hence, the field 422 provides a mechanism for selectively disabling acquisition of a pattern for one instance, while enabling the same for other instances, without having to modify the pattern definition itself. The spare field 430 is a reserved section of bits for future modifications. The repeat count field 432 allows for patterns to be sequentially repeated a configurable number of times. In some applications, it may be preferrable to repeat a faster pattern many times versus dwelling longer at each location of the pattern with a single pass. The repeat count field 432 is a convenient way to configure such applications and also has utility in some other use cases. The flags field 452 indicates at the pattern record level control some characteristics of what is to be done at that scan position. Examples of such characteristics include the mains lock synchronization wait flag, scan sync trigger flag, scan sync wait flag, beam blank flag, and acquisition enable flag.

When executed by the scan engine 334, the sequence of pattern records 450 of the pattern 440 causes the focused portion of the electron beam 114 to move in discrete steps (jumps) along the trajectory defined by the sequence of (X, Y) values in the pattern records 450. Before taking the next jump along the trajectory, the electron beam 114 remains at the current (X, Y) point (the coordinates of which are defined by the values specified in the X position field 456 and the Y position field 458 of the corresponding pattern record 450) for a time duration specified in the corresponding dwell field 454. The dwell time in each (X, Y) point of the trajectory is determined based on the calibrated disturbance waveform. Thus, depending on the shape of the calibrated disturbance waveform and the length of the next jump, the dwell field 454 of different pattern records 450 of the pattern 440 may have different respective values or the same value. For example, for a sine wave, the values specified in the fields 454, 456, 458 of the sequence of pattern records 450 are such that the distance d (1) between the focused portion of the electron beam 114 and the corresponding edge (e.g., 212 or 214, FIG. 2A) is approximately in accordance with the formula $d(t)=A_0 \sin(2\pi f_0 t)$, where $A_0$ is the amplitude (e.g., 1 nm), $f_0$ is the frequency (e.g., 1900 Hz) of the calibrated disturbance waveform, and t is time.

Figure 5:
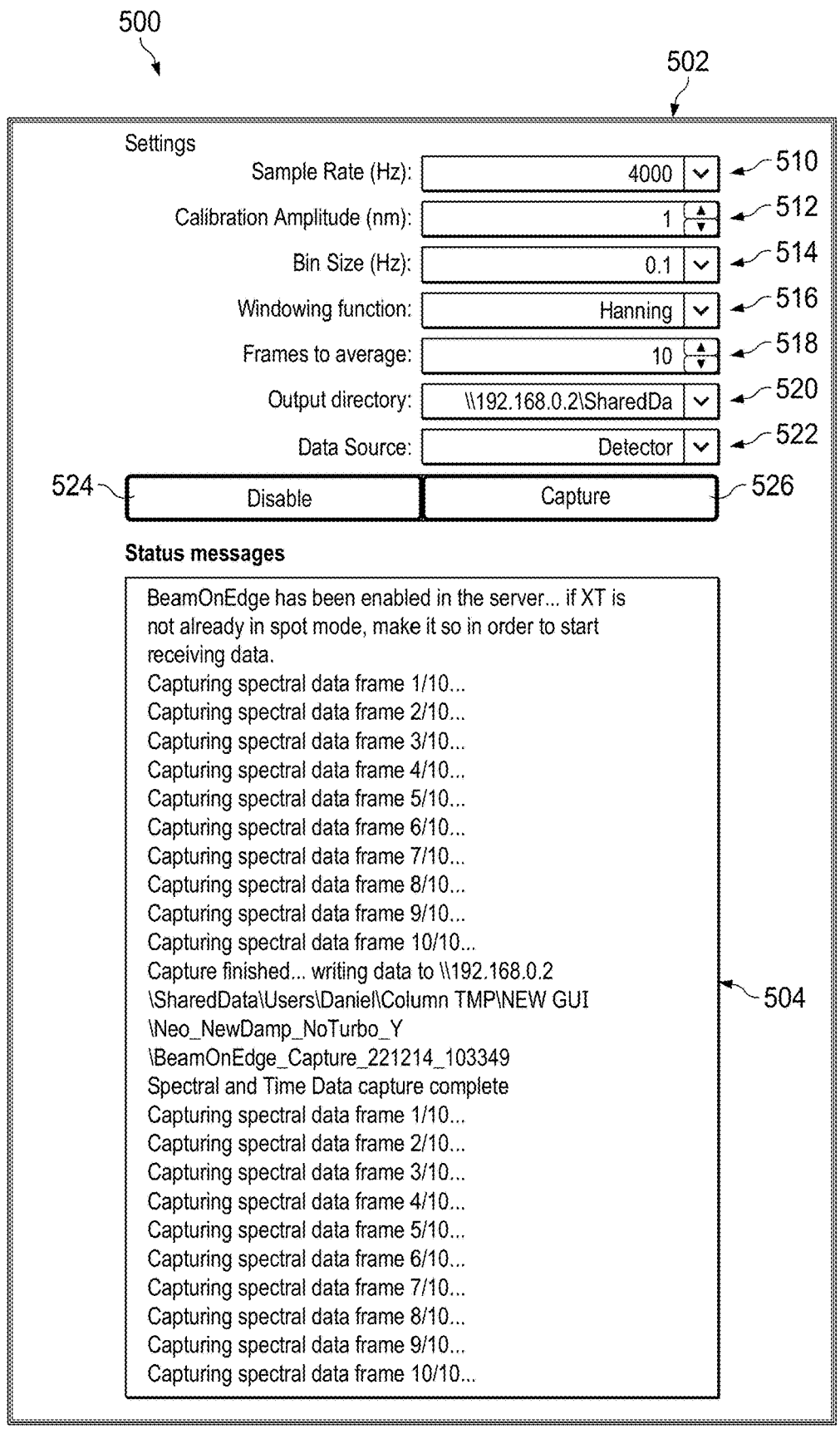
FIGS. 5-7 illustrate several panels of a graphical user interface (GUI) of a beam on edge application according to one example.
Figure 6:
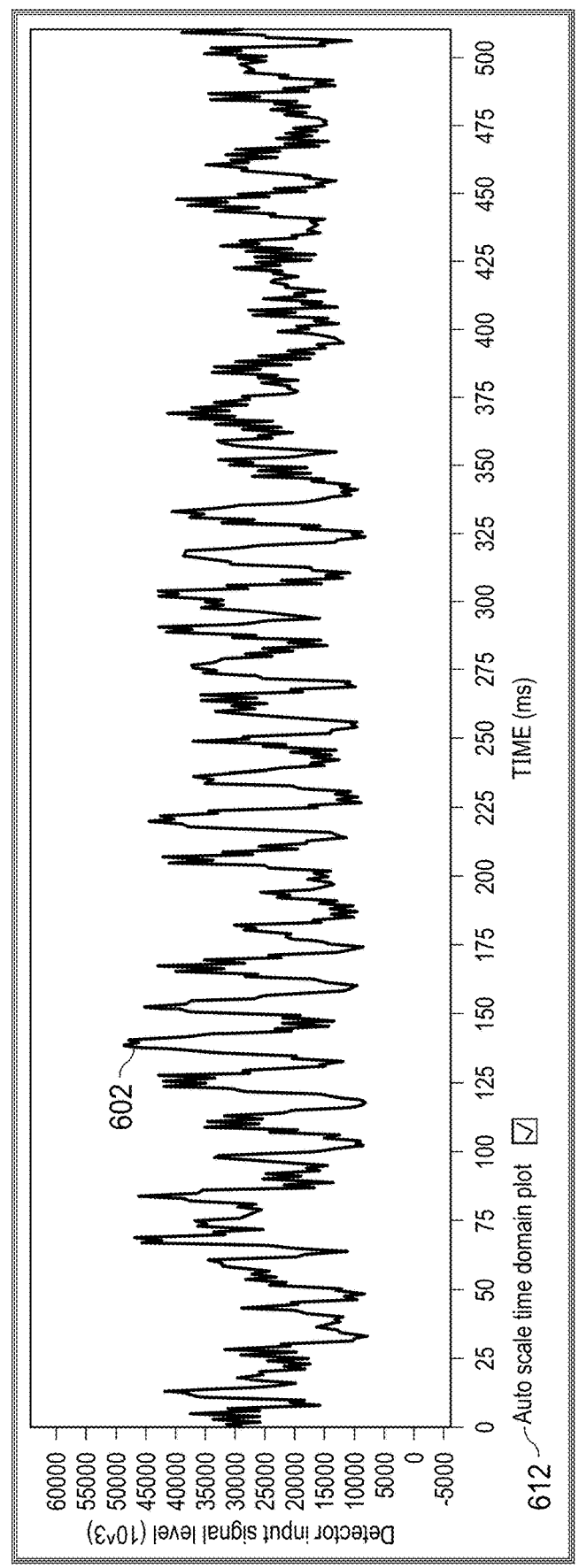
Figure 7:
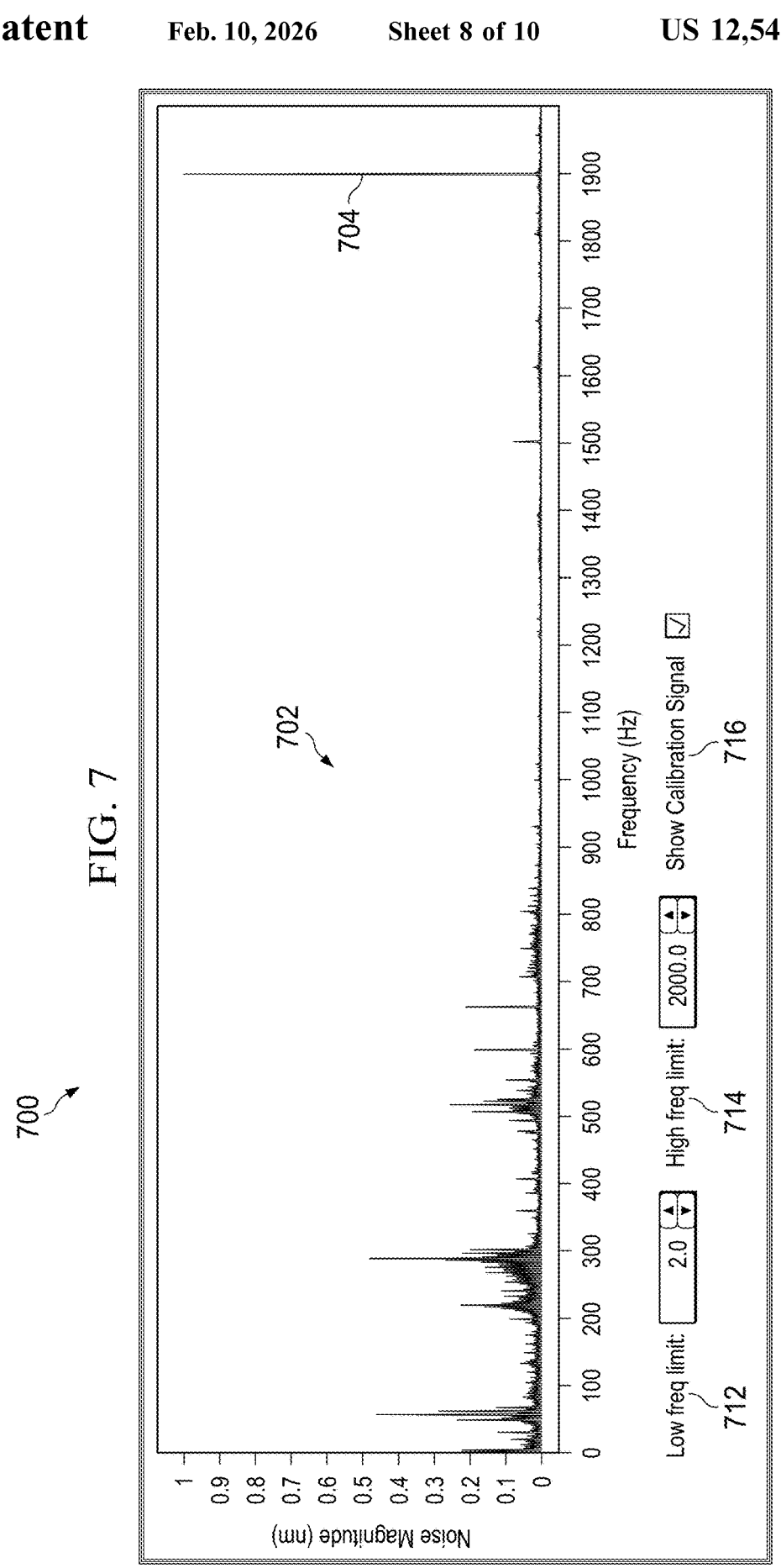

FIGS. 5-7 illustrate panels 500, 600, and 700, respectively, of a graphical user interface (GUI) of the beam on edge application 310 according to one example. In some GUI configurations, the panels 500, 600, and 700 are displayed at the same time in different respective portions of the same (single) screen. In some other GUI configurations, the panels 500, 600, and 700 are displayed on different respective screens or in a time-interleaved (toggled) fashion on the same screen.

Referring to FIG. 5, the panel 500 of the GUI includes a settings menu 502 and a status messages window 504. The settings menu 502 includes selectors 510-522 and buttons 524 and 526. The status messages window 504 displays pertinent application messages to the user about the state and/or progress of the beam on edge measurements.

The Sample Rate selector 510 controls the effective sampling rate of the ADC circuit 366. The corresponding frequency spectrum typically has a frequency range that is one half of the sampling rate value selected with the selector 510. As such, the sampling rate can be selected based on the frequency range expected to encompass the target mechanical disturbance frequencies. As indicated above, the frequency of the calibrated disturbance waveform can be selected to be near an upper end, e.g., at 95%, of this frequency range. In the example shown, the selected sampling rate value is 4000 Hz. Hence, the corresponding covered frequency range is 2000 Hz, and the frequency of the calibrated disturbance is 1900 Hz (also see FIG. 7).

The Calibration Amplitude selector 512 controls the amplitude of the calibrated disturbance waveform. In the example shown, the selected amplitude is 1 nm. Larger amplitudes can typically be selected for larger FOV images.

The Bin Size selector 514 controls the resolution of the frequency spectrum bins in Hz and provides control over the amount of time needed to capture the data versus the frequency resolution of the resulting spectrum. Bin sizes larger than 1 Hz typically need less than one second of acquisition time but provide a coarser frequency resolution. Bin sizes smaller than 1 Hz typically need more than one second of acquisition time but provide a finer frequency resolution. In the example shown, the selected bin size is 0.1 Hz.

The Windowing Function selector 516 controls the fast Fourier transform (FFT) windowing function. In the example shown, the selected windowing function is the Hanning function. Other windowing function selections may include the Flat Top function, the exponential function, the Hamming function, the Kaiser-Bessel function, and the Blackman-Harris function.

The Frames to Average selector 518 controls the number of spectra to average when capturing a final spectrum. A higher number of spectral frames to average typically reduces the noise in the final spectrum at the cost of longer capture time. In the example shown, the selected number of frames to average is ten.

The Output Directory selector 520 controls the memory location where the captured data streams, screenshots, and other outputs of the application 310 are captured in the memory. The Data Source selector 522 controls the source of the input data. In the example shown, the selected source is the instrument's detector, e.g., the detector 160. Alternative selections may provide an option to loopback the signal from the scan position values (X or Y), e.g., for testing the injected calibration signal and/or other configuration adjustments.

The Enable/Disable button 524 controls enabling and disabling the application 310. When enabled, the application 310 automatically overrides the standard spot mode in the instrument-control software module 320 with the above-described spot-mode scan. The Capture button 526 when clicked, will cause the application 310 to capture and average the specified number of spectral frames and then output the results, along with the corresponding screenshots of the settings menu 502 and the graphs of the panels 600 and 700, to the output directory specified in the Output Directory selector 520.

Referring to FIG. 6, the panel 600 of the GUI displays a time domain plot 602 of the captured detector signal and an auto-scale selector 612. As already indicated above, the captured detector signal is modulated by the calibrated disturbance waveform and by the various mechanical vibration disturbances reaching the charged-particle beam column 102. The auto-scale selector 612 controls whether the captured detector signal 602 is plotted automatically over the full frequency range or with user specified frequency bounds.

Referring to FIG. 7, the panel 700 of the GUI displays a frequency domain plot 702 of the captured detector signal and selectors 712-716. In various examples, the frequency domain plot 702 can be a Fourier transform of an individual time domain plot 602 or an average of a specified number (e.g., ten; see the selector 518, FIG. 5) of such Fourier transforms corresponding to different time domain frames. The low frequency limit/high frequency limit selectors 712, 714 specify the lower and upper bounds, respectively, for the frequency domain plot 702. In the example shown, the selectors 712, 714 are set to 2 Hz and 2000 Hz, respectively. The calibrated disturbance waveform has the frequency $f_0$=1900 Hz and is represented in the plot 702 by a corresponding prominent peak 704. Typically, the low frequency limit in the selector 712 is set above the 0 Hz level to exclude the DC component of the spectrum. The Show Calibration Signal selector 716 allows for the calibration peak (such as the peak 704 in the shown example) to be shown in or excluded from the plot 702.

Figure 8:
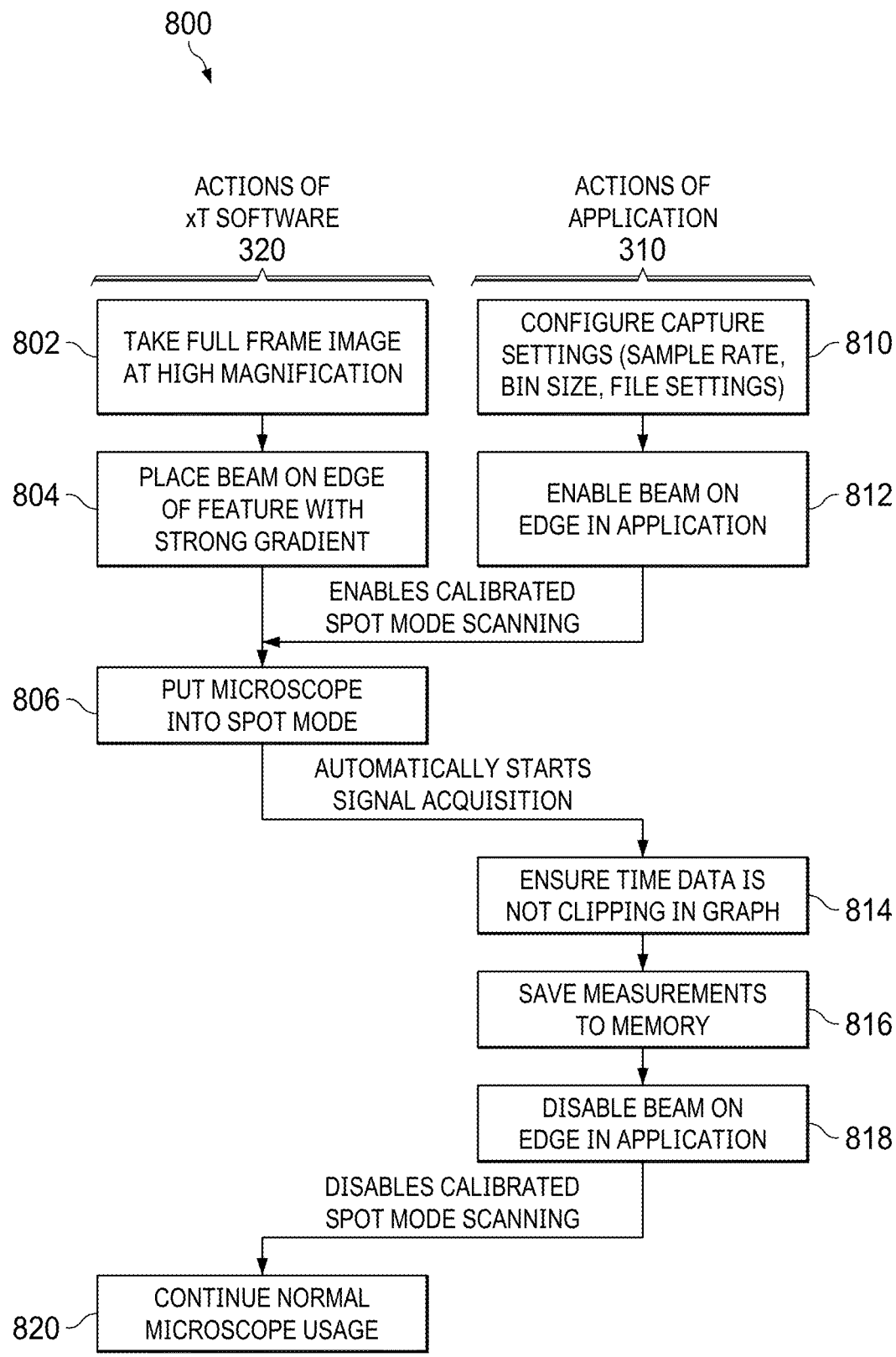
FIG. 8 is a flowchart illustrating a beam on edge measurement method implemented in the scientific instrument of FIG. 1 in accordance with various embodiments.

FIG. 8 is a flowchart illustrating a beam on edge measurement method 800 implemented using the electronic controller 150 in accordance with various embodiments. The electronic controller 150 performs a first set of operations of the method 800 via the instrument-control software module 320. In the example shown, the first set of operations includes the operations of blocks 802, 804, 806, and 820. The electronic controller 150 performs a second set of operations of the method 800 via the beam on edge application (software module) 310. In the example shown, the second set of operations includes the operations of blocks 810, 812, 814, 816, and 818. The method 800 is described in continued reference to FIGS. 1-3 and 8.

In the block 802, the electronic controller 150 operates the scientific instrument 100 in the imaging mode to acquire an image of the sample S at high magnification. In one example, the image acquired in the block 802 is the image 200.

The method 800 also includes the electronic controller 150 being used to select an edge feature characterized by a sharp gradient (in the block 804). In some examples, the edge selecting operations are user assisted, wherein the user moves the cursor 202 within the acquired image onto the selected edge feature. The electronic controller 150 then operates the scientific instrument 100 to move the focused portion of the electron beam 114 into the spot on the sample S corresponding to the position of the cursor 202 in the acquired mage. In some other examples, automated image processing is used to identify and select a suitable edge feature in the acquired image and then cause the electronic controller 150 to move the focused portion of the electron beam 114 into the corresponding spot on the sample S. In one example, the edge feature selected in the block 804 is the edge 212 (FIGS. 2A-2B).

Operations of the block 806 include the electronic controller 150 configuring the scientific instrument 100 to operate in the spot mode.

Operations of the block 810 include configuring the signal capture settings in the application 310. Such configuring includes selecting various parameter values in the GUI of the application 310, e.g., as described above in reference to FIGS. 5-7. Such configuring further includes providing a spot-mode scan definition 400, e.g., as described in reference to FIG. 4.

Operations of the block 812 include enabling the application 310 to modify the spot mode into which the scientific instrument 100 entered in the block 806. Such enabling allows the application 310 to override the standard spot mode settings of the scientific instrument 100 and to cause the instrument-control software module 320 to perform a spot-mode scan in accordance with the spot-mode scan definition 400 provided in the block 810. When the spot-mode scan begins, the electronic controller 150, operates the scientific instrument 100 using the instrument-control software module 320 to start acquiring the detector signal 162.

Operations of the block 814 provide an opportunity to adjust some of the settings within the application 310 for proper capture of the time domain signals (such as 602, FIG. 6) and the corresponding frequency spectra (such as 702, FIG. 7). In some cases, operations of the block 814 are skipped. Operations of the block 816 include the electronic controller 150 saving the measurement results in the memory. Typically, the time domain signals, the corresponding frequency spectra, and the pertinent application and acquisition settings are all saved in the memory in the block 816.

Operations of the block 818 include disabling the application 310. Once the application 310 is disabled, the electronic controller 150 restores the standard spot mode of the block 806 and moves on to fully controlling the scientific instrument 100 via the instrument-control software module 320 in the block 820.

Figure 9:
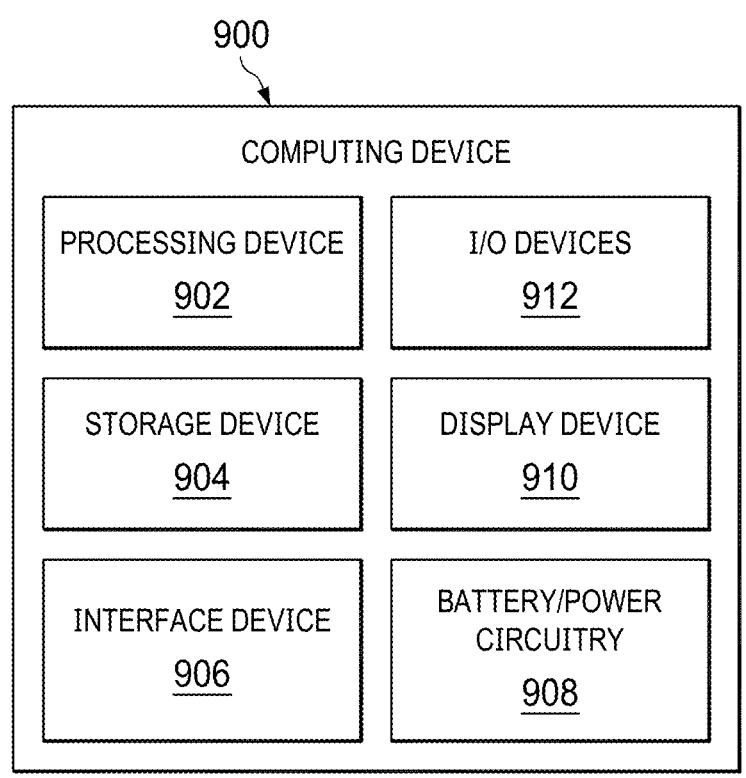
FIG. 9 is a block diagram of an example computing device configured to perform scientific-instrument support operations in accordance with various embodiments.

FIG. 9 is a block diagram of an example computing device 900 configured to perform scientific-instrument support operations in accordance with various embodiments. For example, the computing device 900 can be used to implement the computing device 302. In some embodiments, the computing device 900 performs at least some operations of the electronic controller 150 (also see FIG. 1). In various embodiments, a support module of the scientific instrument 100 may be implemented by a single computing device 900 or by multiple computing devices 900.

The computing device 900 of FIG. 9 is illustrated as having a number of components, but any one or more of these components may be omitted or duplicated, as suitable for the application and setting. In some embodiments, some or all of the components included in the computing device 900 may be attached to one or more motherboards and enclosed in a housing. In some embodiments, some of those components may be fabricated onto a single system-on-a-chip (SoC) (e.g., the SoC may include one or more processing devices 902 and one or more storage devices 904). Additionally, in various embodiments, the computing device 900 may not include one or more of the components illustrated in FIG. 9, but may include interface circuitry for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 900 may not include a display device 910, but may include display device interface circuitry (e.g., a connector and driver circuitry) to which an external display device 910 may be coupled.

The computing device 900 includes a processing device 902 (e.g., one or more processing devices). As used herein, the term "processing device" refers to any device or portion of a device that processes electronic data from registers and/or memory to transform that electronic data into other electronic data that may be stored in registers and/or memory. In various embodiments, the processing device 902 may include one or more digital signal processors (DSPs), application-specific integrated circuits (ASICs), central processing units (CPUs), graphics processing units (GPUs), server processors, or any other suitable processing devices.

The computing device 900 also includes a storage device 904 (e.g., one or more storage devices). In various embodiments, the storage device 904 may include one or more memory devices, such as random-access memory (RAM)

devices (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 904 may include memory that shares a die with the processing device 902. In such an embodiment, the memory may be used as cache memory and include embedded dynamic random-access memory (eDRAM) or spin transfer torque magnetic random-access memory (STT-MRAM), for example. In some embodiments, the storage device 904 may include non-transitory computer readable media having instructions thereon that, when executed by one or more processing devices (e.g., the processing device 902), cause the computing device 900 to perform any appropriate ones of the methods disclosed herein below or portions of such methods.

The computing device 900 further includes an interface device 906 (e.g., one or more interface devices 906). In various embodiments, the interface device 906 may include one or more communication chips, connectors, and/or other hardware and software to govern communications between the computing device 900 and other computing devices. For example, the interface device 906 may include circuitry for managing wireless communications for the transfer of data to and from the computing device 900. The term "wireless" and its derivatives may be used to describe circuits, devices, systems, methods, techniques, communications channels, etc., that may communicate data via modulated electromagnetic radiation through a nonsolid medium. The term does not imply that the associated devices do not contain any wires, although in some embodiments they might not. Circuitry included in the interface device 906 for managing wireless communications may implement any of a number of wireless standards or protocols, including but not limited to Institute for Electrical and Electronic Engineers (IEEE) standards including Wi-Fi (IEEE 802.11 family), IEEE 802.16 standards, Long-Term Evolution (LTE) project along with any amendments, updates, and/or revisions (e.g., advanced LTE project, ultramobile broadband (UMB) project (also referred to as "3GPP2"), etc.). In some embodiments, circuitry included in the interface device 906 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 906 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 906 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 906 may include one or more antennas (e.g., one or more antenna arrays) configured to receive and/or transmit wireless signals.

In some embodiments, the interface device 906 may include circuitry for managing wired communications, such as electrical, optical, or any other suitable communication protocols. For example, the interface device 906 may include circuitry to support communications in accordance with Ethernet technologies. In some embodiments, the interface device 906 may support both wireless and wired communication, and/or may support multiple wired communication protocols and/or multiple wireless communication protocols. For example, a first set of circuitry of the interface device 906 may be dedicated to shorter-range wireless communications such as Wi-Fi or Bluetooth, and a second set of circuitry of the interface device 906 may be dedicated to longer-range wireless communications such as global positioning system (GPS), EDGE, GPRS, CDMA, WiMAX, LTE, EV-DO, or others. In some other embodiments, a first set of circuitry of the interface device 906 may be dedicated to wireless communications, and a second set of circuitry of the interface device 906 may be dedicated to wired communications.

The computing device 900 also includes battery/power circuitry 908. In various embodiments, the battery/power circuitry 908 may include one or more energy storage devices (e.g., batteries or capacitors) and/or circuitry for coupling components of the computing device 900 to an energy source separate from the computing device 900 (e.g., to AC line power).

The computing device 900 also includes a display device 910 (e.g., one or multiple individual display devices). In various embodiments, the display device 910 may include any visual indicators, such as a heads-up display, a computer monitor, a projector, a touchscreen display, a liquid crystal display (LCD), a light-emitting diode display, or a flat panel display.

The computing device 900 also includes additional input/output (I/O) devices 912. In various embodiments, the I/O devices 912 may include one or more data/signal transfer interfaces, audio I/O devices (e.g., microphones or microphone arrays, speakers, headsets, earbuds, alarms, etc.), audio codecs, video codecs, printers, sensors (e.g., thermocouples or other temperature sensors, humidity sensors, pressure sensors, vibration sensors, etc.), image capture devices (e.g., one or more cameras), human interface devices (e.g., keyboards, cursor control devices, such as a mouse, a stylus, a trackball, or a touchpad), etc.

Depending on the specific embodiment of the scientific instrument 100 and/or of the electrical circuit 300, various components of the interface devices 906 and/or I/O devices 912 can be configured to output suitable control signals (e.g., 152, 154, 156) for various components of the scientific instrument 100, receive suitable control/telemetry signals from various components of the scientific instrument 100, and receive streams of measurements (e.g., 162, 172, 182) from various detectors of the scientific instrument 100. In some examples, the interface devices 906 and/or I/O devices 912 include one or more analog-to-digital converters (ADCs) for transforming received analog signals into a digital form suitable for operations performed by the processing device 902 and/or the storage device 904. In some additional examples, the interface devices 906 and/or I/O devices 912 include one or more digital-to-analog converters (DACs) for transforming digital signals provided by the processing device 902 and/or the storage device 904 into an analog form suitable for being communicated to the corresponding components of the scientific instrument 100.

According to one example disclosed above, e.g., in the summary section and/or in reference to any one or any combination of some or all of FIGS. 1-9, provided is a support apparatus for a scientific instrument, the support apparatus comprising: one or more processing devices configured to run a first software module to selectively operate the scientific instrument in a spot mode and in an imaging mode and to run a second software module to configure the first software module to implement a sequence of spot-mode measurements in a plurality of spots along a trajectory crossing an edge feature in a sample; and an interface device to support communications between the one or more processing devices and an acquisition circuit of the scientific instrument, the acquisition circuit being operable to steer a charged-particle beam with respect to the sample and to acquire signals produced via interaction of the charged-particle beam with the sample, wherein the second software module is configured to specify a respective spot location and a respective dwell time for each of the plurality of spots based on a calibrated disturbance waveform; wherein the first software module is configured to receive a time series of the signals acquired by the acquisition circuit during the sequence of spot-mode measurements; and wherein the one or more processing devices are further configured to compute a frequency spectrum of vibrational disturbances in the scientific instrument based on the time series.

In some examples of the above support apparatus, the edge feature is selected based on an image of the sample obtained using the imaging mode.

In some examples of any of the above support apparatus, the one or more processing devices are configured to select the edge feature by applying automated image processing to the image.

In some examples of any of the above support apparatus, the trajectory is locally orthogonal to the edge feature in an intersection area thereof.

In some examples of any of the above support apparatus, the calibrated disturbance waveform is a periodic waveform having a frequency in an audio frequency range.

In some examples of any of the above support apparatus, an amplitude of the calibrated disturbance waveform is in a range between 0.1 nm and 10 nm. Amplitudes outside the range of 0.1 nm to 10 nm are typically not preferred due to the corresponding amplitude scale provided to the frequency spectrum being either too fine or too coarse to facilitate accurate and/or convenient measurements of the magnitudes of various vibrational disturbances in the obtained frequency spectrum in reference to that amplitude scale.

In some examples of any of the above support apparatus, the one or more processing devices are further configured to provide an amplitude scale to the frequency spectrum based on an amplitude of the calibrated disturbance waveform.

In some examples of any of the above support apparatus, the one or more processing devices are further configured to determine a magnitude of a vibrational disturbance in reference to an amplitude of the calibrated disturbance waveform in the frequency spectrum.

In some examples of any of the above support apparatus, the one or more processing devices are further configured to identify a vibrational-disturbance source based on the frequency spectrum of vibrational disturbances.

In some examples of any of the above support apparatus, the frequency of the periodic waveform is smaller than 2 kHz.

In some examples of any of the above support apparatus, the calibrated disturbance waveform is a sine wave mapped onto the trajectory such that a zero level of the sine wave is mapped onto an intersection of the trajectory and the edge feature.

In some examples of any of the above support apparatus, the one or more processing devices are configured to compute the frequency spectrum based on a Fourier transform of the time series.

In some examples of any of the above support apparatus, the scientific instrument includes a scanning electron microscope column; and wherein the charged-particle beam is an electron beam.

In some examples of any of the above support apparatus, the scientific instrument includes a focused ion-beam column; and wherein the charged-particle beam is an atomic or molecular ion beam.

In some examples of any of the above support apparatus, the edge feature comprises a portion of a circumference of a particle; and wherein the portion is selectable to be substantially parallel to a first coordinate axis or substantially parallel to a second coordinate axis, the first and second coordinate axes being mutually orthogonal.

According to one example disclosed above, e.g., in the summary section and/or in reference to any one or any combination of some or all of FIGS. 1-9, provided is an automated method performed via a computing device for providing support to a scientific instrument, the method comprising: running, with a processor, a first software module to selectively operate the scientific instrument in a spot mode and in an imaging mode; running, with the processor, a second software module to configure the first software module to implement a sequence of spot-mode measurements in a plurality of spots along a trajectory crossing an edge feature in a sample; and transmitting, via an interface device, communications between the processor and an acquisition circuit of the scientific instrument, the acquisition circuit being operable to steer a charged-particle beam with respect to the sample and to acquire signals produced via interaction of the charged-particle beam with the sample, wherein the second software module is configured to specify a respective spot location and a respective dwell time for each of the plurality of spots based on a calibrated disturbance waveform; wherein the first software module is configured to receive a time series of the signals acquired by the acquisition circuit during the sequence; and wherein the automated method further comprises computing, with the processor, a frequency spectrum of vibrational disturbances in the scientific instrument based on the time series.

In some examples of the above automated method, the running the first software module comprises obtaining an image of the sample using the imaging mode; wherein the edge feature is selected based on the image; and wherein the computing comprises computing a Fourier transform of the time series.

In some examples of any of the above automated methods, the automated method further comprises applying, with the processor, automated image processing to the image to select the edge feature.

In some examples of any of the above automated methods, the trajectory is locally orthogonal to the edge feature in an intersection area thereof; and wherein the calibrated disturbance waveform is a periodic waveform having a frequency in an audio frequency range.

In some examples of any of the above automated methods, the automated method further comprises mapping, with the processor, a sine wave onto the trajectory such that a zero level of the sine wave is mapped onto an intersection of the trajectory and the edge feature.

In some examples of any of the above automated methods, the plurality of spots has between $10^3$ and $5 \times 10^5$ spots.

It is to be understood that the above description is intended to be illustrative and not restrictive. Many implementations and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future examples. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed subject matter incorporate more features than are expressly recited in each claim. Rather, as the following claims reflect, inventive subject matter lies in fewer than all features of a single disclosed example. Thus, the following claims are hereby incorporated into the Detailed Description, with each claim standing on its own as a separately claimed subject matter.

Unless explicitly stated otherwise, each numerical value and range should be interpreted as being approximate as if the word "about" or "approximately" preceded the value or range.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the terms "circuit," "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Any numerical range recited herein includes all values from the lower value to the upper value. For example, if a range is stated as 1% to 50%, it is intended that the narrower ranges thereof, such as 2% to 40%, 10% to 30%, 1% to 3%, etc., are expressly enumerated by said statement. These specific examples represent only a limited subset of what is intended to be covered, and all possible combinations of numerical values between and including the lowest value and the highest value of the enumerated range are to be considered to be expressly stated in this application.

The modifier "about" or "approximately" used in connection with a quantity is inclusive of the stated value and has the meaning dictated by the context (for example, it includes at least the degree of error associated with the measurement of the particular quantity). The modifier "about" or "approximately" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so that, for example "about 1" may also mean from 0.5 to 1.4.

What is claimed is:

1. A support apparatus for a scientific instrument, the support apparatus comprising:
   one or more processing devices configured to run a first software module to selectively operate the scientific instrument in a spot mode and in an imaging mode and to run a second software module to configure the first software module to implement a sequence of spot-mode measurements in a plurality of spots along a trajectory crossing an edge feature in a sample; and
   an interface device to support communications between the one or more processing devices and an acquisition circuit of the scientific instrument, the acquisition circuit being operable to steer a charged-particle beam with respect to the sample and to acquire signals produced via interaction of the charged-particle beam with the sample,
   wherein the second software module is configured to specify a respective spot location and a respective dwell time for each of the plurality of spots based on a calibrated disturbance waveform;
   wherein the first software module is configured to receive a time series of the signals acquired by the acquisition circuit during the sequence of spot-mode measurements; and
   wherein the one or more processing devices are further configured to compute a frequency spectrum of vibrational disturbances in the scientific instrument based on the time series.

2. The support apparatus of claim 1, wherein the edge feature is selected based on an image of the sample obtained using the imaging mode.

3. The support apparatus of claim 2, wherein the one or more processing devices are configured to select the edge feature by applying automated image processing to the image.

4. The support apparatus of claim 1,
   wherein the trajectory is locally orthogonal to the edge feature in an intersection area thereof;
   wherein the calibrated disturbance waveform is a periodic waveform having a frequency in an audio frequency range; and
   wherein an amplitude of the calibrated disturbance waveform is in a range between 0.1 nm and 10 nm.

5. The support apparatus of claim 1, wherein the one or more processing devices are further configured to provide an amplitude scale to the frequency spectrum based on an amplitude of the calibrated disturbance waveform.

6. The support apparatus of claim 1, wherein the one or more processing devices are further configured to determine a magnitude of a vibrational disturbance in reference to an amplitude of the calibrated disturbance waveform in the frequency spectrum.

7. The support apparatus of claim 1, wherein the one or more processing devices are further configured to identify a vibrational-disturbance source based on the frequency spectrum of vibrational disturbances.

8. The support apparatus of claim 1, wherein the calibrated disturbance waveform is a sine wave mapped onto the trajectory such that a zero level of the sine wave is mapped onto an intersection of the trajectory and the edge feature.

9. The support apparatus of claim 1, wherein the one or more processing devices are configured to compute the frequency spectrum based on a Fourier transform of the time series.

10. The support apparatus of claim 1, wherein the plurality of spots has between $10^3$ and $5 \times 10^5$ spots.

11. The support apparatus of claim 1,
    wherein the scientific instrument includes a scanning electron microscope column; and
    wherein the charged-particle beam is an electron beam.

12. The support apparatus of claim 1,
    wherein the scientific instrument includes a focused ion-beam column; and
    wherein the charged-particle beam is an atomic or molecular ion beam.

13. The support apparatus of claim 1,
    wherein the edge feature comprises a portion of a circumference of a particle; and
    wherein the portion is selectable to be substantially parallel to a first coordinate axis or substantially parallel to a second coordinate axis, the first and second coordinate axes being mutually orthogonal.

14. An automated method performed via a computing device for providing support to a scientific instrument, the method comprising:
    running, with a processor, a first software module to selectively operate the scientific instrument in a spot mode and in an imaging mode;
    running, with the processor, a second software module to configure the first software module to implement a sequence of spot-mode measurements in a plurality of spots along a trajectory crossing an edge feature in a sample; and
    transmitting, via an interface device, communications between the processor and an acquisition circuit of the scientific instrument, the acquisition circuit being operable to steer a charged-particle beam with respect to the sample and to acquire signals produced via interaction of the charged-particle beam with the sample,
    wherein the second software module is configured to specify a respective spot location and a respective dwell time for each of the plurality of spots based on a calibrated disturbance waveform;
    wherein the first software module is configured to receive a time series of the signals acquired by the acquisition circuit during the sequence; and
    wherein the automated method further comprises computing, with the processor, a frequency spectrum of vibrational disturbances in the scientific instrument based on the time series.

15. The automated method of claim 14,
wherein the running the first software module comprises obtaining an image of the sample using the imaging mode;
wherein the edge feature is selected based on the image; and
wherein the computing comprises computing a Fourier transform of the time series.

16. The automated method of claim 15, further comprising applying, with the processor, automated image processing to the image to select the edge feature.

17. The automated method of claim 14,
wherein the trajectory is locally orthogonal to the edge feature in an intersection area thereof; and
wherein the calibrated disturbance waveform is a periodic waveform having a frequency in an audio frequency range.

18. The automated method of claim 14, further comprising mapping, with the processor, a sine wave onto the trajectory such that a zero level of the sine wave is mapped onto an intersection of the trajectory and the edge feature.

19. The automated method of claim 14, wherein the plurality of spots has between $10^3$ and $5 \times 10^5$ spots.

20. A non-transitory computer-readable medium storing instructions that, when executed by a computing device, cause the computing device to perform operations comprising the automated method of claim 14.

* * * * *